(12) United States Patent  
MacDougall

(10) Patent No.: US 8,446,572 B2  
(45) Date of Patent: May 21, 2013

(54) SENSING SYSTEM

(75) Inventor: John MacDougall, Edinburgh (GB)

(73) Assignee: Selex Galileo Ltd., Basildon, Essex (GB)

( * ) Notice: Subject to any disclaimer, the term of this patent is extended or adjusted under 35 U.S.C. 154(b) by 897 days.

(21) Appl. No.: 10/483,759

(22) Filed: Nov. 24, 2004

(65) Prior Publication Data

US 2012/0019814 A1 Jan. 26, 2012

Related U.S. Application Data

(63) Continuation of application No. 10/138,861, filed on May 3, 2002, now abandoned.

(30) Foreign Application Priority Data

May 10, 2001 (GB) .................................. 0111855.3

(51) Int. Cl.  
*G01C 3/08* (2006.01)
(52) U.S. Cl.  
USPC .......................................... 356/5.04
(58) Field of Classification Search  
USPC ........................... 356/5.04; 348/31  
See application file for complete search history.

(56) References Cited

U.S. PATENT DOCUMENTS

| 4,708,473 | A |   | 11/1987 | Metzdorff et al. |
| 4,867,558 | A |   | 9/1989 | Leonard et al. |
| 4,952,809 | A |   | 8/1990 | McEwen |
| 5,231,480 | A | * | 7/1993 | Ulich ............................. 348/31 |
| 5,233,415 | A | * | 8/1993 | French et al. .................... 348/31 |
| 5,343,284 | A | * | 8/1994 | Keeler et al. .................. 356/4.01 |
| 5,450,125 | A | * | 9/1995 | Ulich et al. ...................... 348/31 |
| 5,467,122 | A | * | 11/1995 | Bowker et al. .................. 348/31 |
| 5,696,577 | A | * | 12/1997 | Stettner et al. ............... 356/4.01 |
| 6,121,600 | A |   | 9/2000 | Saldana et al. |
| 6,380,871 | B1 | * | 4/2002 | Kaplan ......................... 340/984 |

FOREIGN PATENT DOCUMENTS

| DE | 34 04 396 C2 | 2/1994 |
| EP | 0 363 735 A2 | 4/1990 |
| WO | WO 99/05473 | 2/1999 |

* cited by examiner

*Primary Examiner* — Mark Hellner  
(74) *Attorney, Agent, or Firm* — Crowell & Moring LLP

(57) ABSTRACT

Described herein is an improved sensing system (30) and its method of operation. The system (30) includes a camera (16) for viewing an external scene, the camera comprising one or more detector(s) and has a field of view (40) which overlaps with the path (32) of a pulsed laser (12). The laser path (32) and radiation from the scene viewed (40) share a beamsplitter (36) and a window (38). In order to substantially reduce back-scattered radiation from the laser path (32) affecting operation of the detector(s) of the camera (16), the detector(s) is (are) switched in accordance with the operation of the laser (12) to be "off" or non-receiving when the laser (12) is "on" or firing.

6 Claims, 3 Drawing Sheets

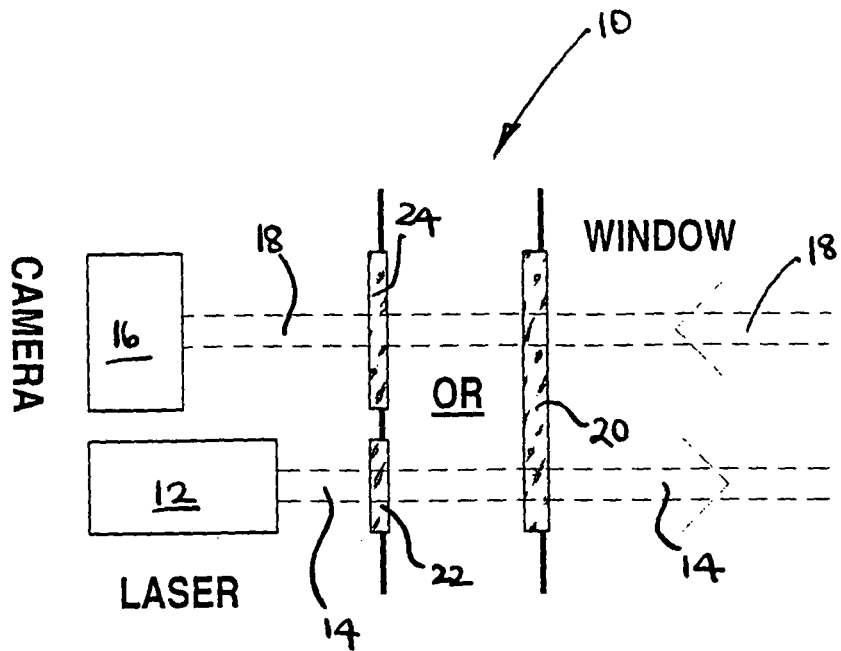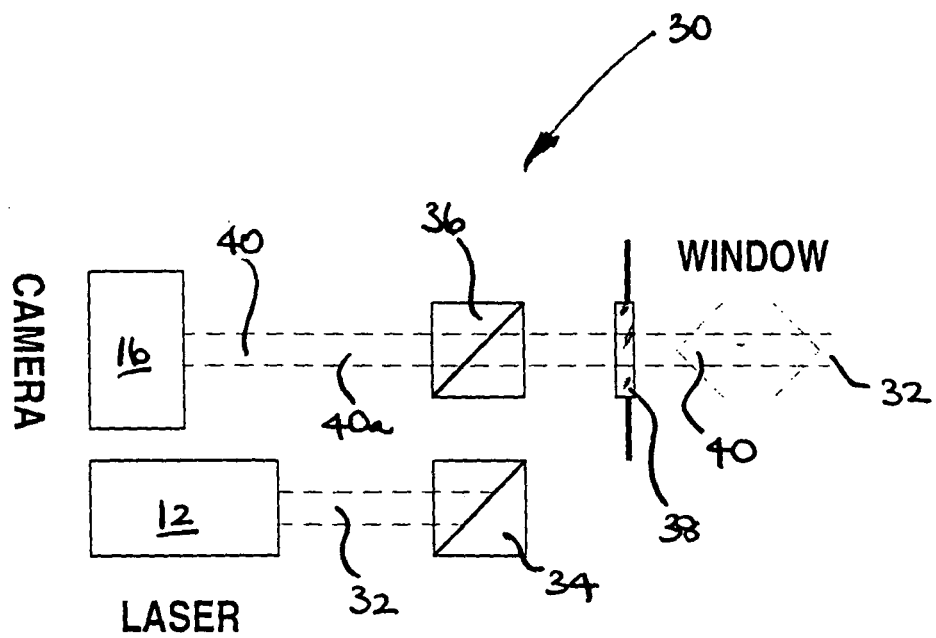

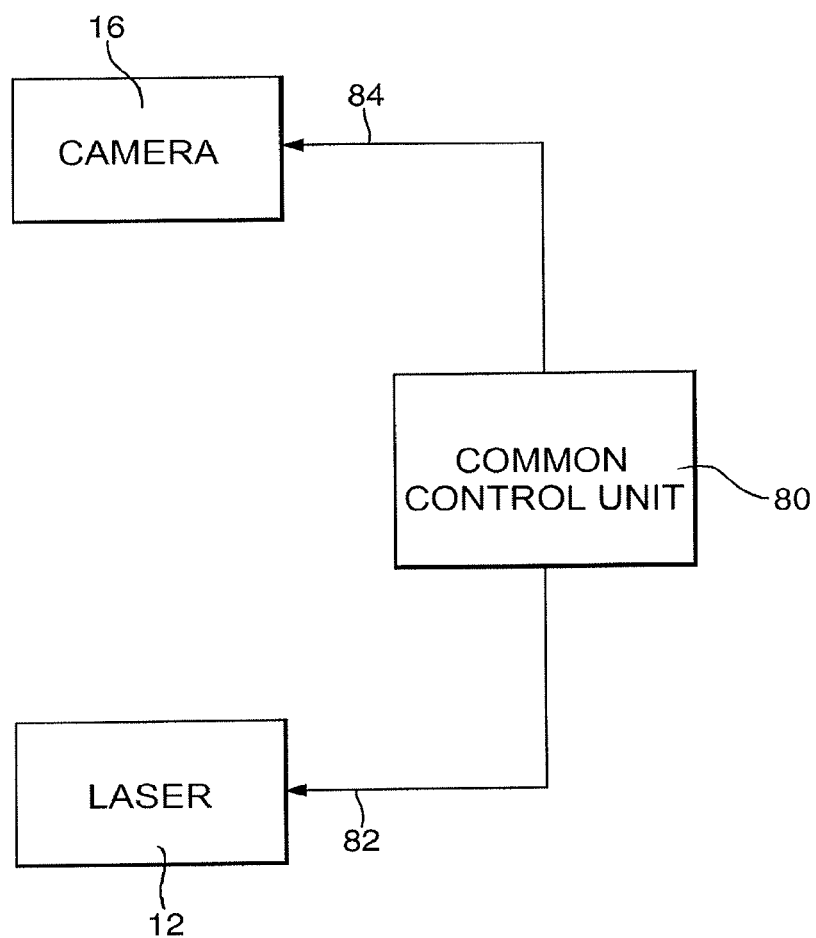

SENSING SYSTEM

The present invention relates to improvements in or relating to sensing systems operating in the presence of pulsed lasers, and is more particularly concerned with such systems operating over a spectral band that includes that of a nearby pulsed laser system.

The sensing system, for example, focal plane array (FPA) imaging system, includes detectors which receive radiation from the scene being viewed.

In the majority of focal plane array (FPA) sensors, photon energy from a scene falls on detectors of the array, causing a current to flow which charges up a capacitor for the period that the FPA is switched 'on'. This period is known as the 'stare' period. At the end of the 'stare' period, the detectors in the FPA are disconnected from the capacitor and the capacitor voltage is connected to a readout circuit, for subsequent reading and processing. This is known as the 'readout' period. The capacitor voltage for each detector represents the number of photons accumulated during the 'stare' period.

Whilst such sensing systems are passive and do not utilise any means for illuminating the object, they are often associated with a pulsed laser which is used for illuminating all or part of the scene viewed or, for example, for estimating range to an object in the scene. When space is not a problem, the field of view of the sensor is totally separate from the path of the pulsed laser and the laser does not interfere with the operation of the sensing system. However, when space is a premium, it is often necessary to arrange the sensing system and pulsed laser such that there is an overlap between the field of view of the sensing system and the path of the pulsed laser, and in some cases, there may be a requirement to share optical components. This tends to give rise to the possibility of radiation from the laser being scattered by the shared optical components, which scattered radiation being sufficient to temporarily 'blind' the sensing system.

It is therefore an object of the present invention to provide an improved sensing system which does not suffer the problems of temporary blinding of the detector when the field of view thereof overlaps with the path of a pulsed laser located adjacent thereto.

In accordance with one aspect of the present invention, there is provided a method of operating a sensing system which comprises a sensor for viewing an external scene, the sensor comprising one or more detector(s) and has a field of view which overlaps with the path of a pulsed laser, the method comprising the step of:—
switching the detector(s) in accordance with operation of the pulsed laser to at least substantially reduce back-scattered radiation on overlapping portions of the laser path and the sensor field of view.

Advantageously, switching of the detector(s) is achieved using circuitry for switching the detector(s) between a 'stare' period and a 'readout' period.

In accordance with another aspect of the present invention, there is provided a sensing system comprising:—
a sensor for sensing a viewed scene, the sensor comprising one or more detector(s) and has a field of view which overlaps with the path of a pulsed laser; and
control means for controlling the operation of the detector (s), the control means including switching means for switching the detector(s) in accordance with operation of the laser to at least substantially reduce back-scattered radiation on overlapping portions of the laser path and the sensor field of view.

The detector may be a charge-coupled device the detectors arranged as a focal plane array.

Additionally, the control means includes a readout circuit for reading and processing information received at the detectors.

For a better understanding of the present invention, reference will now be made, by way of example only, to the accompanying drawings in which:—

FIG. 1 illustrates a sensing system having a field of view which is separated from the path for a pulsed laser;

FIG. 2 illustrates a sensing system having a field of view which overlaps the path for a pulsed laser;

FIG. 5 illustrates control means for the FIG. 2 sensing system.

Figure 3:
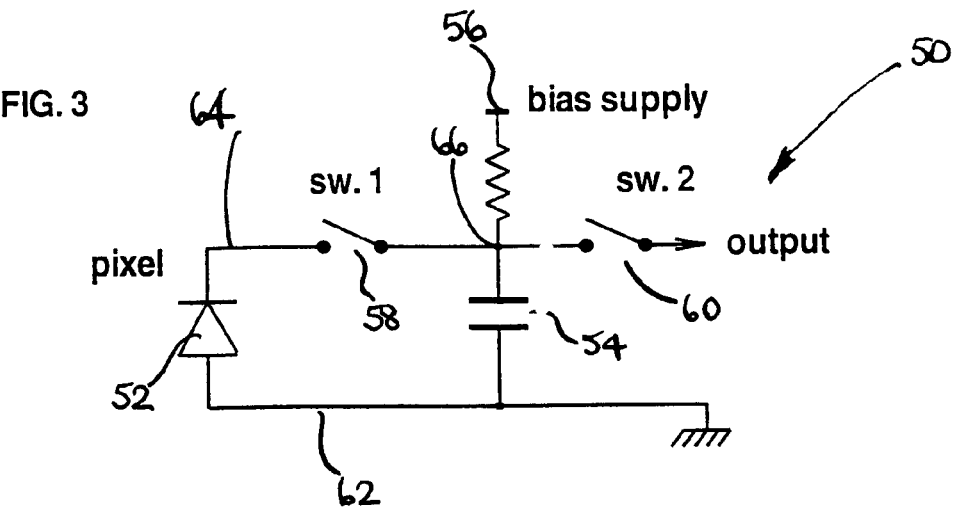
FIG. 3 illustrates a circuit arrangement associated with each detector of a sensor.

FIG. 1 illustrates a known sensing system 10 which comprises a sensing system 16, for example, a camera, which views a scene (not shown) within its field of view 18. A pulsed laser 12 is located adjacent the sensing system 10 (and does not form part of it) and has a path 14 for directing pulses of radiation towards an object in the scene (not shown). As shown in FIG. 1, the path 14 of the laser 12 is separate from the field of view 18 of the camera 16 and there is no overlap between the two. This is achieved when a single window 20 is used which is of sufficient size to prevent overlap of the field of view 18 with the laser path 14. Alternatively, the single window 20 may be replaced by two smaller windows 22, 24 for respective ones of the laser path 14 and the sensor field of view 18.

It will be appreciated that, in both embodiments of FIG. 1, the laser path 14 and the sensor field of view 18 each has its own separate optical components, that is, the path 14 of laser 12 uses the lower part of window 20 or window 22 and the field of view 18 of camera 16 uses the upper part of window 20 or window 24, and there is no overlap between the illumination path 14 and the field of view 18.

When space is an issue, it is known to provide a sensing system and a laser system which share some optical components. Such an arrangement is shown in FIG. 2. Components described previously with reference to FIG. 1 are referenced alike.

In FIG. 2, a sensing system 30 is shown which comprises a camera 16 as before, which has a field of view designated 40. As shown anything in the field of view 40 will be passed back to the camera 16 via window 38 and beamsplitter 36. Laser 12 is located adjacent to the sensing system 30 as before but in this case, its path 32 is required to share the same window 38. Radiation from the laser 12 passes through a beamsplitter or angled mirror 34 which directs it toward beamsplitter 36 and window 38 for transmission to an object in a scene (not shown). This means that beamsplitter 36 and window 38 are shared, that is, are common to both the path 32 of laser 12 and to the field of view 40 of the camera 16. Due to the laser path 32 and the field of view 40 sharing the same optical components, it is possible that outgoing radiation on the laser path 32 may be reflected into the field of view 40 as indicated by 40a and be directed to the camera 16 by beamsplitter 36. This back reflection causes the camera 16 to be temporarily 'blinded' so that it is often then not able to form an image of the scene in its field of view 40 when required.

In accordance with the present invention, an electronic 'shutter' is provided which prevents the back-scattered radiation in the field of view 40 as indicated by 40a reaching the camera 16 and effectively 'blinding' it, albeit temporarily, when the laser 12 is 'on'.

A sensing system or camera comprises an array of detector elements which can be as large as 256×256 elements or 642×512 elements. Each detector element is effectively a diode connected in a circuit as shown in FIG. 3.

In FIG. 3, a circuit 50 is shown which comprises a detector diode 52, a capacitor 54, a bias supply 56, and first and second switches 58, 60 respectively. As shown, one side of the detector diode 52 is connected via line 62 to ground. The other side of the detector diode 52 is connected to line 64 which has switches 58, 60 located in it. The capacitor 54 is connected in parallel with the detector diode 52 across lines 62 and 64 as shown, joining line 64 at junction 66. The bias supply 56 is also connected to junction 66. The first switch 58 is positioned detector-side of junction 66 and the second switch 60 is positioned on the output side of junction 66. The end of line 64 provides an output.

In operation, the voltage on the capacitor 54 rises to a level approaching that of the bias supply 56. Radiation incident on the detector diode 52 causes a current to discharge the capacitor 54 during the 'stare' period when the first switch 58 is closed. The 'stare' period is the time for which the detector diode 52 is receiving radiation from the scene viewed (not shown). At the end of the 'stare' period, the first switch 58 is opened, and the voltage on the capacitor 54 is measured by closing the second switch 60. The total incident radiation on the detector diode 52 during the 'stare' period is calculated from the difference in voltage from that of the bias supply 56.

In most embodiments of a detection system incorporating a circuit 50 for each detector diode 52, the first switches 58 for all detectors are operated together, that is, they are operated in parallel during the 'stare' period. At the end of the 'stare' time, the second switches 60 are operated on an individual basis, that is, they are operated in series.

According to the present invention, the first switches 58 are open during the period when the laser is on. This prevents back-scattered light from the laser falling on the detector diode 52 and affecting the charge on the capacitor 54 during the 'stare' period. In other words, the camera is designed to reduce the time for which the first switch 58 is closed so that the 'stare' period does not overlap the laser 'on' time. As a result, the detector diode 52 has to be operated at higher switching speeds than those currently employed in its normal mode of operation. This provides an arrangement in which charge storage of the detector diode 52 is decoupled in synchronism with pulses generated by a separate pulsed laser.

Figure 4:
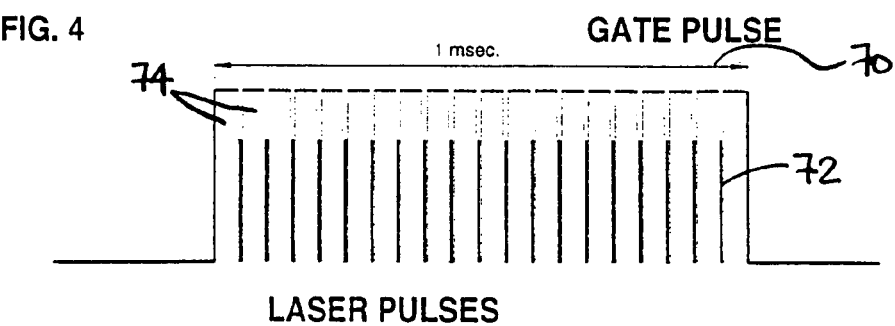
FIG. 4 illustrates a gated pulse for a series of laser pulses in a radiation beam.

FIG. 4 illustrates a relatively long gate period, or 'stare' period, normally used, as indicated by reference numeral 70, and the higher rate of 'blanking', reference numerals 72, necessary to prevent saturation of the detector by back-scattered radiation from the short and rapid laser pulses 74. In FIG. 4, twenty laser pulses 76 are shown per 1 ms gate period.

In FIG. 5, a laser 12 and a camera 16 are shown connected to a common control unit 80 via respective lines 82, 84. The control unit 80 provides synchronising signals on line 82 which enables the camera 16 to be decoupled in synchronism with the pulses of the laser 12, and control signals on line 84 for the laser operation.

It will be understood that the camera 16 preferably comprises a plurality of charge-coupled devices arranged as a focal plane array.

It will be appreciated that the present invention is not limited to sensing systems which share optical components with a pulsed laser but is equally applicable to any sensing system where there is an overlap between the field of view of the camera and the path of a pulsed laser even when this overlap occurs outside of the sensing system.

In accordance with the present invention, a camera as described above is provided with an immunity to outgoing laser pulses which are in the same waveband as the operating waveband of the camera.

The present invention becomes necessary as the power of the lasers is continually increasing. Moreover, the sizes of the windows through which the radiation beam is transmitted and the radiation corresponding to the field of view is received tends to be decreasing. Furthermore, these types of systems are always operated to the limit of sensitivity of the detectors.

The invention claimed is:

1. A method of operating a sensing system which comprises a sensor for viewing an external scene, the sensor comprising at least one detector and circuitry associated with each detector comprising a detector diode, a capacitor disposed in parallel with the detector diode, a first switch, a second switch, and a bias supply interconnected by way of a junction to the first and second switches so that the first switch is positioned between the detector diode and the junction and the second switch is positioned between the junction and an output of the circuitry, the sensor having a field of view which overlaps with the path of a pulsed laser, the method comprising:

switching the detector in accordance with operation of the pulsed laser to at least substantially reduce back-scattered radiation on overlapping portions of the laser path and the sensor field of view using the circuitry to switch the detector between a 'stare' period, when the first switch is closed and current discharges to the capacitor, and a 'readout' period, when the second switch is closed and voltage on the capacitor is measured, so that the 'stare' period does not overlap an 'on' time of the pulsed laser.

2. A sensing system comprising:

a sensor for viewing a viewed scene, the sensor comprising at least one detector and circuitry associated with each detector comprising a detector diode, a capacitor disposed in parallel with the detector diode, a first switch, a second switch, and a bias supply interconnected by way of a junction to the first and second switches so that the first switch is positioned between the detector diode and the junction and the second switch is positioned between the junction and an output of the circuitry, the sensor having a field of view which overlaps with a path of a pulsed laser; and control means for controlling the operation of the detector, the control means using the circuitry to switch the detector between a 'stare' period, when the first switch is closed and current discharges to the capacitor, and a 'readout' period, when the second switch is closed and voltage on the capacitor is measured, in accordance with operation of the laser so that the 'stare' period does not overlap an 'on' time of the pulsed laser to at least substantially reduce back-scattered radiation on overlapping portions of the laser path and the sensor field of view.

3. A system according to claim 2, wherein each detector comprises a charge-coupled device.

4. A system according to claim 3, wherein the sensor is a multi-element sensor.

5. A system according to claim 4, wherein the multi-element sensor is in the form of a focal plane array.

6. A system according to claim 5, wherein the circuitry reads and processes information received at the detector.

* * * * *